350-336 SR SUBSTITUTE FOR MISSING OR

OR 3,877,015

T 350/336

X1068R X1076E X1054R

4

United States Patent

Kanazaki et al.

[11] 3,877,015

[45] Apr. 8, 1975

[54] MULTIDIGIT LIQUID CRYSTAL DISPLAY DEVICE

[75] Inventors: Mikio Kanazaki, Mobara; Fumio Nakano, Hitachi; Hidetoshi Abe, Katsuta; Kazuhisa Toriyama; Mikio Sato, both of Hitachi, all of Japan

[73] Assignee: Hitachi, Ltd., Tokyo, Japan

[22] Filed: Jan. 22, 1973

[21] Appl. No.: 325,523

[30] Foreign Application Priority Data

Jan. 21, 1972 Japan .................................. 47-7602

[52] U.S. Cl. ....... 340/336; 340/324 R; 350/160 LC

[51] Int. Cl. ............................................ G09f 9/32

[58] Field of Search ...... 340/324 RM, 336, 166 EL; 350/160 LC

[56] References Cited

UNITED STATES PATENTS

| | | | |
|---|---|---|---|
| 3,401,262 | 9/1968 | Fergason et al. | 350/160 LC |
| 3,499,112 | 3/1970 | Heilmeier et al. | 350/160 LC |
| 3,576,364 | 4/1971 | Zanoni | 340/324 R |
| 3,781,863 | 12/1973 | Fujita | 350/160 LC |
| 3,786,486 | 1/1974 | Torresi | 350/160 LC |

OTHER PUBLICATIONS

A Two-Frequency Coincidence Addressing Scheme. . .Stein et al. Applied Physics Letters, Vol. 19, No. 9, Nov. 1971, pp 343-345.

*Primary Examiner*—John W. Caldwell
*Assistant Examiner*—Marshall M. Curtis
*Attorney, Agent, or Firm*—Craig & Antonelli

[57] ABSTRACT

A liquid crystal display device suitable for multi-digit display in which only the part of the liquid crystal at the segment electrodes in the pattern to be displayed is excited by arranging the electrodes to the device and the leads for connecting the electrodes to the terminals for outer lead connection in such a manner that any lead never overlaps nor crossesover the electrodes or any other lead.

4 Claims, 7 Drawing Figures

MULTIDIGIT LIQUID CRYSTAL DISPLAY DEVICE

The present invention relates to a display device, and more particularly to a liquid crystal display device suitable for multi-digit display.

A liquid crystal display device is such a display device that liquid crystals having an electrooptic effect are interposed between a pair of plates, at least one of which is transparent and which together form an envelope, and an electric potential is selectively applied to part or all of the liquid crystal depending on the pattern to be displayed to display a desired pattern. For the purpose of the application of the electric potential to alter the orientation of the liquid crystal, opposing electrodes, at least one of which is transparent, are provided on the envelope plates. The electrode on one plate consists of segment electrodes corresponding to the pattern to be displayed. In the prior art liquid crystal display device having such a structure, when an electric potential is applied across the opposing electrodes, the part of the liquid crystal which needs not be displayed is also displayed in addition to that part which is to be displayed. It has been very difficult particularly in multidigit liquid crystal display devices not to display those parts which are not to be displayed.

An object of the present invention is to provide a liquid crystal display device in which the part of the liquid crystal other than the segment electrode part for pattern display does not cause the electrooptic effect, that is, a liquid crystal display device which does not have any display part unnecessary for pattern display.

According to the present invention there is provided a liquid crystal display device comprising at least one pair of electrodes opposing each other, at least one electrode of said pair being transparent and one electrode of said pair consisting of segment electrodes arranged in a configuration corresponding to a pattern to be displayed, leads for connecting said electrodes to terminals for outer lead connection, respectively, and a liquid crystal interposed between said pair of electrodes, characterized in that any one of said leads does not overlap nor crossover said electrodes or the remaining leads.

The present invention will become more apparent from the following detailed description of an embodiment of the present invention when taken in conjunction with the accompanying drawings, in which.

Figure 1:
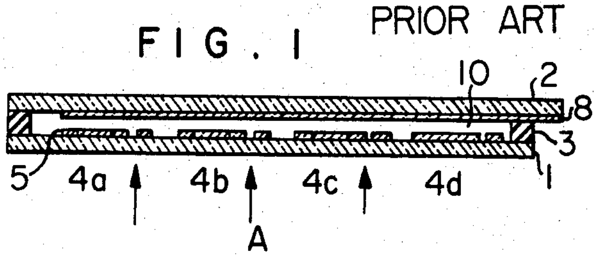
FIG. 1 is a cross-sectional view of a prior art multidigit liquid crystal display device.
Figure 2:
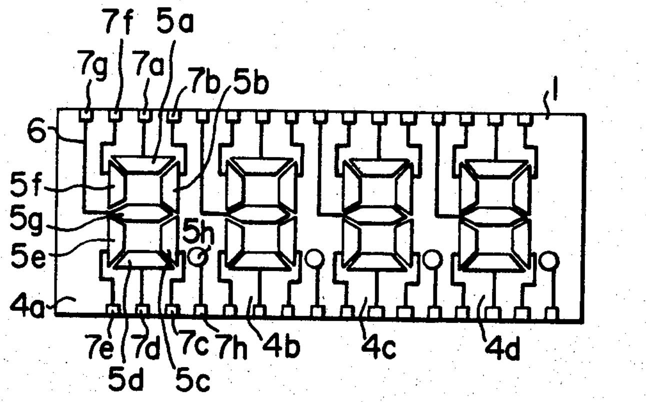
FIG. 2 is a plan view of prior art segment electrodes for displaying digits employed in the device of FIG. 1.
Figure 3:
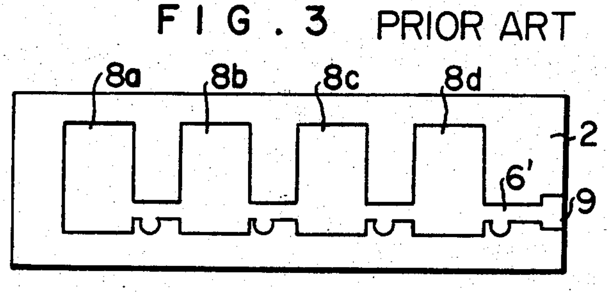
FIG. 3 is a plan view of a prior art electrode opposing to the segment electrodes of FIG. 2.

Referring to FIGS. 1 to 3 which schematically illustrate a cross-section of a conventional multi-digit liquid crystal display device, the segment electrodes thereof and the opposing electrode to the segment electrodes, respectively, the liquid crystal display device comprises a pair of spaced transparent plates 1 and 2 and a spacer 3 interposed therebetween. On the inner face of the plate 1 are arranged a necessary number of segment electrode groups 4*a* to 4*d* each of which groups is composed of eight transparent segment electrodes 5*a* to 5*h* and represents a digit. The segment electrodes 5*a* to 5*h* of each digit are connected to terminals 7*a* to 7*h* for outer lead connection arranged on the peripheral portion of the plate 1 by leads 6 formed of an electrically conductive transparent film, respectively. On the inner face of the plate 2 are arranged electrodes 8*a* to 8*d* formed of an electrically conductive transparent film in such a manner that each of the electrodes opposes the electrodes 5*a* to 5*h* of the corresponding digit. These electrodes 8*a* to 8*d* are interconnected by a lead 6' formed of an electrically conductive transparent film which in turn extends to a terminal 9 for outer lead connection disposed at a peripheral portion of the plate 2. The spacer 3 in FIG. 1 consists of an insulating plate such as a plastic film or a glass plate having a thickness of from 2 to 100 microns.

The space 10 defined by the plates 1 and 2 and the spacer 3 is filled with a liquid crystal, for example, a nematic liquid crystal. The pattern display portions of such a liquid crystal display device are normally transparent so that the light incident thereon from, for example, the direction A (FIG. 1) passes through the device without substantially being scattered. Thus, in the normal state, it is not discernible at a glance where the electrodes 5*a* to 5*h* and 8*a* to 8*d* and the leads 6 and 6' are arranged. However, when a DC or AC voltage is applied across a selected pattern display portion, for example the portion 4*a* through the terminals 7*a* to 7*d* and 9 and the corresponding electrodes 5*a* to 5*d* and 8*a*, the part of the liquid crystal therebetween becomes milky white and scatters incident light by the electrooptic effect of the liquid crystal to display a desired pattern.

However, such a liquid crystal display device requires the same number of terminals as the number of the segment electrodes, and hence a large number of terminals are required when the number of digits is large. For example, 64 terminals are required for eight digits, while 32 terminals are necessary for four digits. This fact leads to the drawback that the drive circuit for a multidigit display device becomes complicated and the reliability is reduced when the multi-digit display device is combined with and incorporated in such an apparatus as a desk electronic calculator or a counter.

A method of reducing the number of terminals is that corresponding segment electrodes of respective patterns or digits are interconnected by a lead of an electrically conductive transparent film and connected to a common terminal, while each pattern of the opposing electrode is connected to each separate terminal. In this manner the number of terminals is considerably reduced as seen from FIGS. 4 and 5 which illustrate an example of the method of reducing the number of terminals. However, even this method has the drawback that the electrooptic effect is caused to occur at the part of the liquid crystal interposed between the lead 6 and the opposing electrode 8 to display undesired lead pattern.

Therefore, the present invention is intended to provide a liquid crystal display device particularly suitable for multi-digit display in which the number of terminals are markedly reduced and yet any part of the liquid crystal other than the segment electrode parts is not excited by forming the segment electrodes and the opposing electrode in a particular configuration.

Figure 4:
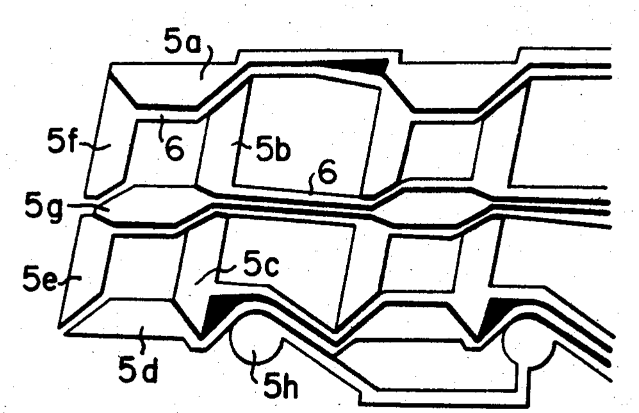
FIG. 4 is a plan view of an interconnection of segment electrodes for two digits.
Figure 5:
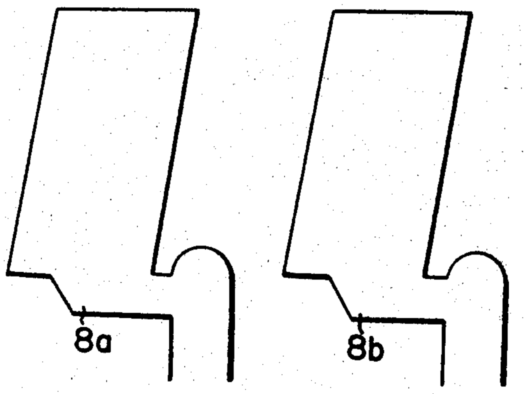
FIG. 5 is a plan view of a prior art arrangement of electrodes opposing to segment electrodes of FIG. 4.
Figure 6:
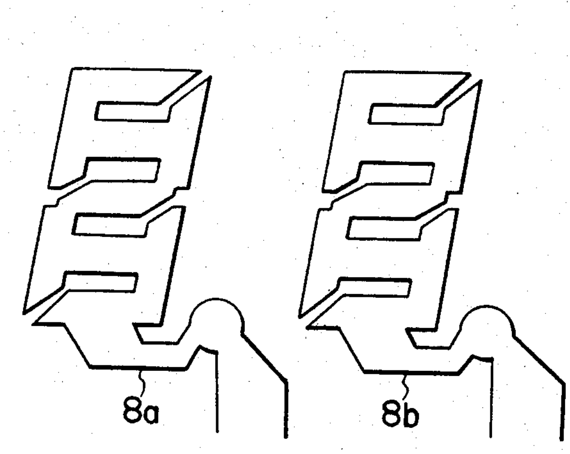
FIG. 6 is a plan view of an arrangement according to the present invention of electrodes opposing the segment electrodes of FIG. 4.
Figure 7:
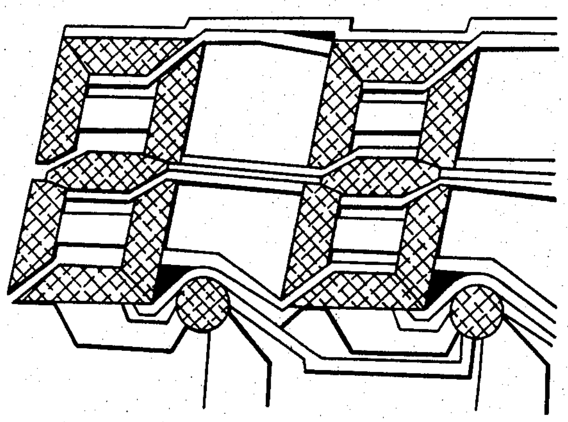
FIG. 7 is a plan view of superimposition of the electrodes of FIGS. 4 and 6 on each other.

To achieve the above object the present invention employs the pattern of the segment electrodes as shown in FIG. 4 and the pattern of the opposing electrode as shown in FIG. 6. When these patterns are superimposed on each other, only the cross-hatched portions of the patterns shown in FIG. 7 overlap or in registration with each other and any one of the leads does not overlap nor crossover nor is in registration with any part of the electrodes or any other lead. Consequently, only that part of the liquid crystal which is interposed between the cross-hatched portions of the electrodes is excited when an electric potential is applied between the electrodes.

The pattern of the embodiment of the present invention described above with reference to FIGS. 4 and 6 by way of example only is of a seven segment type configuration. However, the present invention can be applied to a pattern of any configuration. If the liquid crystal display device is a multi-digit display device, the confuguration of each digit or pattern may or may not be different from those of the other digits or patterns, and each digit or pattern can be displayed independently of the other digits or patterns in the time sharing drive scheme which is customary in the desk electronic calculator or counter technology.

In the four digit display device of the seven segment type configuration shown in FIGS. 2 and 3 the number of the terminals is 33 (for the segment electrodes: 32 and for the opposing electrode: 1), while in the arrangement of FIG. 4 the number of the terminals is only 12 (for the segment electrode: 8, and for the opposing electrodes: 4) as described hereinabove. The difference in the number of the terminals becomes greater as the number of the digits increases. This method of electrode connection is very effective for multi-digit display when combined with the method of electrode arrangement according to the present invention.

The above description has been made of the case in which both the segment and opposing electrodes are formed of a transparent electrically conductive film. However, either the segment electrodes or the opposing electrodes can be formed of a light reflecting electrically conductive film such as an evaporated aluminium film.

Further, the base plates 1 and 2 may be formed of a transparent organic material such as acryl resin instead of transparent glass. Also the base plates 1 and 2 can be made opaque except for the pattern display portion.

What we claim is:

1. In a liquid crystal display device comprising a first and a second substrate at least one of which is transparent, a liquid crystal layer intervening between the first and second substrates, segment electrode means intervening between the first substrate and the liquid crystal layer in a configuration corresponding to a pattern to be displayed, opposing electrode means intervening between the second substrate and the liquid crystal layer and positioned opposite the segment electrode means for applying together with the segment electrode means a predetermined voltage to the liquid crystal layer, a first and a second group of leads respectively arranged in the same planes as the segment electrode means and the opposing electrode means for respectively supplying a voltage to the segment electrode means and the opposing electrode means, the segment electrode means consisting of a plurality of segment groups each of which consist of a plurality of segments, only the corresponding segments in the adjacent segment groups being connected through the first lead group, the improvement comprising the opposing electrode means consisting of a plurality of opposed electrodes each of which is arranged independently opposed to the corresponding segment group and each opposed electrode including a plurality of conductive portions corresponding to and in registration with the segments of a segment group, the plurality of conductive portions being electrically separated from one another at areas in registration with the first lead group and interconnected only in areas not in registration with the first lead group, whereby display of the pattern of the first lead group is avoided.

2. A liquid crystal display device according to claim 1, wherein the second group of leads includes a plurality of leads, each respective one of the leads being connected to a respective opposed electrode for applying a predetermined voltage to all the conductive portions of the opposed electrode.

3. In a liquid crystal device comprising a first and a second substrate at least one of which is transparent, a liquid crystal layer intervening between the first and second substrates, segment electrode means intervening between the first substrate and the liquid crystal layer in a configuration corresponding to a pattern to be displayed, opposing electrode means intervening between the second substrate and the liquid crystal layer and positioned opposite the segment electrode means for applying together with the segment electrode means a predetermined voltage to the liquid crystal layer, a first and a second group of leads respectively arranged in the same planes as the segment electrode means and the opposing electrode means for respectively supplying a voltage to the segment electrode means and the opposing electrode means, the segment electrode means consisting of a plurality of segment groups, each of which consists of a plurality of segments, only the corresponding segments in the adjacent segment groups being connected through the first lead group, the improvement comprising the opposing electrode means consisting of a plurality of opposed electrodes, each of which has substantially the same shape as that of the corresponding segment group and being arranged independently opposed thereto, each opposed electrode including a plurality of conductive portions corresponding to and in registration with the segments of a segment group, the plurality of conductive portions being electrically separated from one another at areas in registration with the first lead group and interconnected only in areas not in registration with the first lead group, the first lead group and the second lead group not being in registration with each other, the segment electrode means and the opposing electrode means.

4. A liquid crystal display device according to claim 3, wherein each segment group is formed in a configuration consisting of a pattern of a figure 8 formed by seven segments and one segment representing a decimal point which is arranged in the vicinity of the figure 8 pattern.

* * * * *